United States Patent
Pringiers

(10) Patent No.: US 6,588,862 B1
(45) Date of Patent: Jul. 8, 2003

(54) RUBBER CRAWLER TRACK

(76) Inventor: Koenraad Pringiers, 80 A Layards Rd., Colombo 5, Sri Lanka (BE)

( * ) Notice: Subject to any disclaimer, the term of this patent is extended or adjusted under 35 U.S.C. 154(b) by 0 days.

(21) Appl. No.: 10/019,657

(22) PCT Filed: Jul. 3, 2000

(86) PCT No.: PCT/BE00/00076
§ 371 (c)(1),
(2), (4) Date: Feb. 28, 2002

(87) PCT Pub. No.: WO01/02236
PCT Pub. Date: Jan. 11, 2001

(30) Foreign Application Priority Data

Feb. 7, 1999 (BE) .......................................... 09900459

(51) Int. Cl.⁷ .............................................. B62D 55/24
(52) U.S. Cl. ...................... 305/167; 305/172; 305/173; 305/177
(58) Field of Search ................................ 305/157, 165, 305/167, 171, 172, 173, 177, 185, 193, 197, 198, 201

(56) References Cited

U.S. PATENT DOCUMENTS

| | | | | |
|---|---|---|---|---|
| 5,308,155 A | * | 5/1994 | Katoh | 305/174 |
| 5,380,076 A | * | 1/1995 | Hori | 305/171 |
| 5,403,643 A | * | 4/1995 | Tsuru | 428/120 |
| 5,522,654 A | * | 6/1996 | Katoh | 305/174 |
| 5,593,218 A | * | 1/1997 | Katoh et al. | 305/174 |
| 6,106,083 A | * | 8/2000 | Ono | 305/171 |
| 6,170,925 B1 | * | 1/2001 | Ono | 305/177 |
| 6,176,557 B1 | * | 1/2001 | Ono | 305/177 |
| 6,450,593 B2 | * | 9/2002 | Hori | 305/173 |

FOREIGN PATENT DOCUMENTS

| | | |
|---|---|---|
| EP | 0 428 725 | 5/1991 |
| EP | 0 913 321 | 5/1999 |
| FR | 2 707 536 | 1/1995 |

OTHER PUBLICATIONS

Patent Abstracts of Japan, vol. 015, No. 232 (M–1124), Jun. 13, 1991 & JP 03 070687 A (Yokohama Rubber Co. Ltd:THE), Mar. 26, 1991, abstract; figures 1–4.

Patent Abstracts of Japan, vol. 1995, No. 02, Mar. 31, 1995 & JP06 316281 A (Bridgestone Corp), Nov. 15, 1994, abstract; figures 1,2,4,5,7.

* cited by examiner

Primary Examiner—S. Joseph Morano
Assistant Examiner—Lung B Nguyen
(74) Attorney, Agent, or Firm—Pillsbury Winthrop LLP

(57) ABSTRACT

This invention relates to a molded crawler track comprising metallic core bars set in an endless rubber belt. The core bars comprise first and second wings (2, 4) extending in a transverse direction to the axis of the track and, between the wings, a sprocket part (3) which is engaged by a drive sprocket. A protrusion (5, 15) is provided on either side of the sprocket part, i.e. protruding out of the plane of the wings towards the guide wheel for the track. The protrusions serve to guide the track over the guide wheels. The protrusions are inclined; one forward, one towards the rear; The relative dimensions of the elements of the core bars, are given. This combination of features reduces the occurrence of fatigue fractures and cracks in the belt.

31 Claims, 3 Drawing Sheets

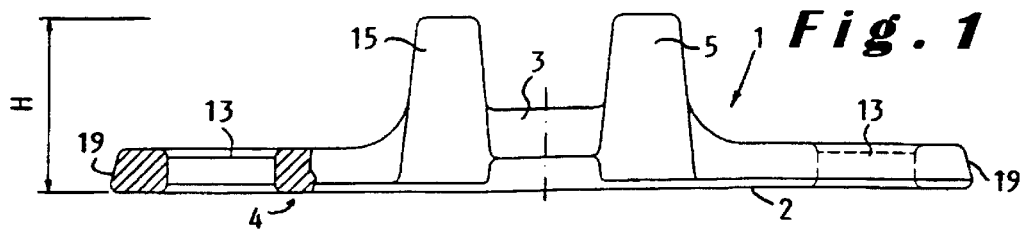
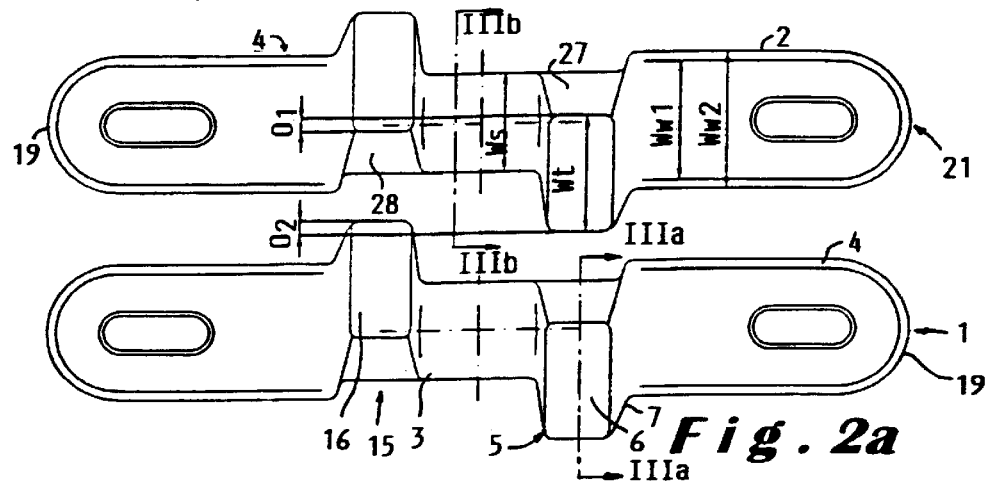
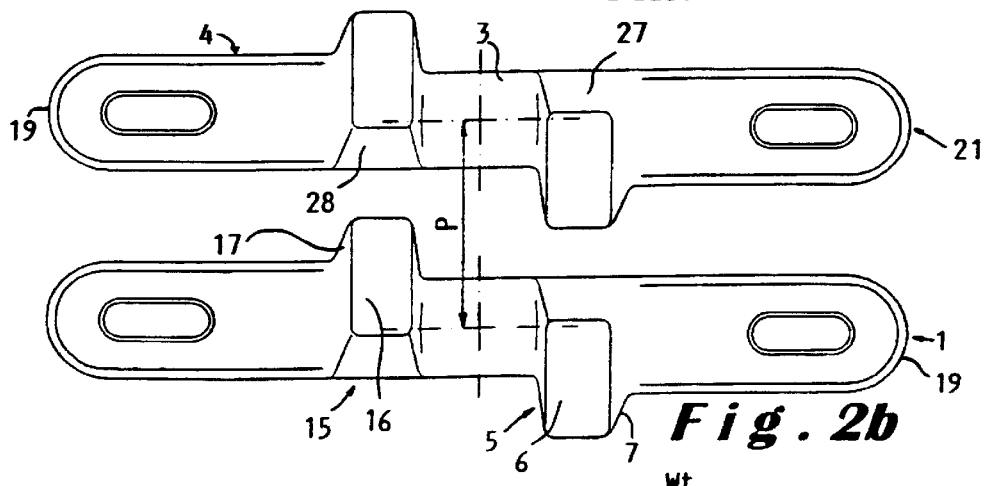
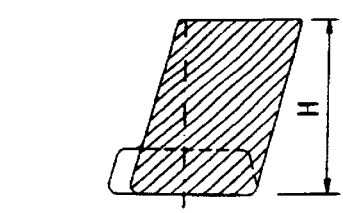
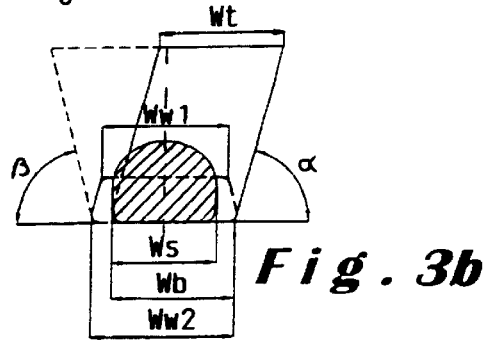

RUBBER CRAWLER TRACK

This application is the National Phase of International Application PCT/BE00/00076 filed Jul. 3, 2000 which designated the U.S. and that International Application was published under PCT Article 21(2) in English.

CROSS-REFERENCE TO RELATED APPLICATIONS not applicable

STATEMENT REGARDING FEDERALLY SPONSORED RESEARCH OR DEVELOPMENT not applicable

BACKGROUND (1) Field of the invention

The present invention relates generally to a rubber crawler.

(2) Description of related art

From EP-A-0.118.912 a rubber crawler is known comprising an endless rubber belt driven around a toothed sprocket wheel and intermediate wheel. In the interior of the rubber crawler, distributed over the internal circumference of the belt, between the sprocket wheel and intermediate wheel, supporting rolls are provided for supporting the rubber belt. In longitudinal direction of the belt, at a regular distance from each other and parallel to each other, a plurality of metal core elements are embedded to drive the rubber crawler around the sprocket wheel and the intermediate wheel. Each metal link contains a basis with a center, the basis extending in transverse direction of the rubber belt, the center of the basis comprising a guiding. On both sides of the guiding a protrusion which protrudes towards the inner surface of the rubber belt, is provided in such a way that protrusions of successive metal links form the running surface for the supporting rolls. In order to render the running surface as continuous as possible, the protrusions are elongated in longitudinal direction of the crawler and extend in longitudinal direction of the rubber belt with respect to the metal link. The space between the basis of the metal link and the bottom side of the protrusion is at least partly filled with rubber.

The rubber crawler disclosed in EP-A-118.912 however presents the disadvantage that its stiffness in the bending direction of the crawler is too large, which leads to the formation of cracks and causes fatigue fractures in the rubber belt especially in the rubber phase located between the metal links, during use of the rubber crawler.

SUMMARY

The inventions, according to one aspect, provide a rubber crawler with which the formation of the above described cracks and fatigue fractures can be decreased.

This is achieved according to the claimed inventions which provide, in accordance with one aspect thereof, a rubber crawler arrangement in which first and second protrusions respectively show, on opposite sides of the metal link and in transverse direction of the rubber crawler, a first and second front surface which extend from the basis of the metal link in upward direction thereof. Both the first and second front surface slant—taken in longitudinal direction of the crawler—in opposite directions with respect to the basis. The slope of the first and second front surface with respect to the basis is smaller than 90°, so that the metal links can be embedded in the rubber crawler in such a way that the space between the front surface of the protrusions and the inner surface of the rubber belt remains almost free of rubber.

The top surfaces of the first and second protrusions have, taken in longitudinal direction of the crawler, a length $W_t$, which is smaller than the width of the basis $W_b$, taken in longitudinal direction of the crawler, so that the protrusions do not extend with respect to the metal link. Because of the limited length of the protrusions and the absence of a bond between the protrusion, in particular the front surface thereof and the rubber belt, a larger free space remains between the protrusions of successive metal links. In that way on the one hand a reduction of the minimum possible bending radius of the rubber crawler can be obtained, while simultaneously the bendability and flexibility of the rubber belt in the moving direction of the crawler can be improved. Simultaneously, evacuation of stones and sand which may end up between the successive links during use of the rubber crawler can be improved. Also, because of the absence of a bond between the front surface of the protrusion and the rubber belt, stresses on the rubber of the belt caused by the tilting of the links within the belt, which lead to the formation of cracks and fatigue fractures, can be reduced.

The slopes α and β of the front surfaces of the first and second protrusions with respect to the basis are geared to the length of the running surface of the first and second protrusions $W_t$ in such a way that the top surfaces of the first and second protrusions within one and the same metal link show an overlap $O_1$ in transverse direction of the crawler which is >0, and the top surfaces of the first and second protrusions of successive metal links show an overlap $O_2$ in transverse direction of the rubber crawler which is also >0. Herewith $O_1$ and $O_2$ and the length $W_t$ of the top surfaces of the first and second protrusions, taken in longitudinal direction of the crawler, are chosen such that $$O_1 + O_2 = 2W_t - P$$

in which P is the distance between the centers of two successive metal links.

By gearing the angles α and β to the length $W_t$ of the top surfaces of the first and second protrusions, it is possible to limit $W_t$ in such a way that the protrusions taken in longitudinal direction of the rubber crawler do not extend with respect to the metal link, while maintaining an overlap between the protrusions within one link and between successive links and thus maintaining continuity of the running surface of the supporting rolls. Consequently, $W_t$ is smaller than the width of the basis $W_b$, taken in longitudinal direction of the crawler. Because the length of the top surfaces of the protrusions is limited, it is possible to positively influence the bendability and the life time of the rubber crawler. By the particular mounting of the protrusions and improved continuity, the running surface of the supporting rolls can be optimized and vibrations caused by the movement of the supporting rolls over the running surface of the metal links can be kept under control.

The inventions described and claimed herein provide a rubber crawler with an improved flexibility in the moving direction of the crawler, in which the risk to the occurrence of cracks or fatigue fractures in the rubber can be reduced. At the same time an improved evacuation of materials which may end up between the links during use of the rubber crawler is made possible. Due to the improved continuity of the running surface of the supporting rolls, vibrations caused by a discontinuous contact of the supporting rolls with the successive metal links can be diminished correspondingly. Thus, with this invention a simultaneous improvement of the flexibility of the crawler and the evacuation of outside materials from the crawler can be obtained, as well as an optimization of the continuity of the running surface of the supporting rolls.

$O_1$ is preferably substantially equal to $O_2$ to obtain a running surface for the supporting rolls with an optimal continuity.

Preferably also the length of the running surfaces of the first and second protrusions $W_t$ is larger than or equal to $W_s$, $W_s$ being the width of the sprocket of the metal part, in order to provide a sufficient overlap between protrusions of successive metal links even in the case of a rubber crawler with a narrow sprocket.

To allow the stabilization of the metal link in the rubber belt to be improved, without sacrificing the bendability and flexibility of the rubber crawler, the first and second wings preferably have a substantially constant width over their entire length ($W_{W2}$ below and $W_{W1}$ on top), measured in the longitudinal direction of the rubber crawler.

To simplify the production process of the metal links and the rubber crawler the angle a between the front surface of the first protrusion and the basis is preferably substantially equal to the angle β between the front surface of the second protrusion and the basis, and the length $W_t$ of the first protrusion is equal to the length $W_t$ of the second protrusion.

Preferably the first and second protrusions have, on a position where they pass into the basis, taken in longitudinal direction of the crawler, a width $W_b$, which is substantially equal to the width of the wing $W_{W2}$. This feature allows an approximately seamless passing of the protrusion into the basis and a substantial, often a complete support of the basis of the protrusion by the basis of the metal link, thus leading to an improved transfer of forces exerted on the protrusion to the basis of the metal link and an improved durability of the protrusions.

In the rubber crawler of this invention the length $W_t$ of the top surfaces of the first and second protrusions is preferably smaller than or equal to the width of the bottom sides of the first and second wings ($W_{W2}$), measured in longitudinal direction of the rubber belt. Thus, an improved stabilization of the metal link in the rubber belt without endangering the flexibility of the belt in doing so can be achieved.

If so desired one or more holes can be provided in the first and second wings for purposes of further reducing the weight and the cost of the metal links and providing an improved anchoring of the links in the rubber of the belt.

From EP-A-490.829 a rubber crawler is known in which each metal link contains a central sprocket, and in which protrusions are provided on both sides of the sprocket. The protrusions comprise a first pair of flaps which are located on a short distance from each other and extend parallel to each other in longitudinal direction with respect to one side of the metal link, and a second pair of parallel flaps which are distant from each other and extend in opposite direction with respect to the metal link. To improve the continuity of the running surface of the supporting rolls, the first flaps of a first link are located between the second flaps of a subsequent link. However because of the presence of the flaps, the rubber crawler of EP-A-490.829 shows an even larger stiffness and an increased risk to the occurrence of cracks and fatigue fractures than the one disclosed in EP-A0.118.912.

The inventions also provide processes for the manufacturing of a rubber crawler.

In the mold a first and a second oblong holder are mounted parallel with each other in longitudinal direction of the rubber crawler. Each holder contains a plurality of parallel partitions, between which holes are provided for receiving the protrusions of the metal links, the protrusions resting with their top surfaces on the bottom of the holder. The partitions make sure that the metal links are held on a fixed distance from each other. The partitions of the first and second holders are, taken in transverse direction of the crawler, arranged in line, so that the metal links are received in transverse direction of the crawler. The length of a partition measured in longitudinal direction of the holder defines the distance between successive metal links. The length of the hole measured in longitudinal direction of the holder is chosen such that there is not too much play between the partitions and the protrusion, in order to prevent that the protrusions would be covered with rubber. After the metal links have been positioned in the holders, the mold is closed and filled with rubber.

After the rubber has been vulcanized, the crawler is removed from the mold and the holders are removed from the crawler.

The inventions are further elucidated in the appended figures and description of the figures.

BRIEF DESCRIPTION OF THE SEVERAL VIEW OF THE DRAWINGS

FIG. 1 shows a section of a metal link of this invention.

FIGS. 2a and 2b shows a view of successive metal links of this invention.

FIG. 3a is a section along the line IIIa in FIG. 1. FIG. 3b shows a section along the line IIIb in FIG. 1.

DETAILED DESCRIPTION

Figure 4:
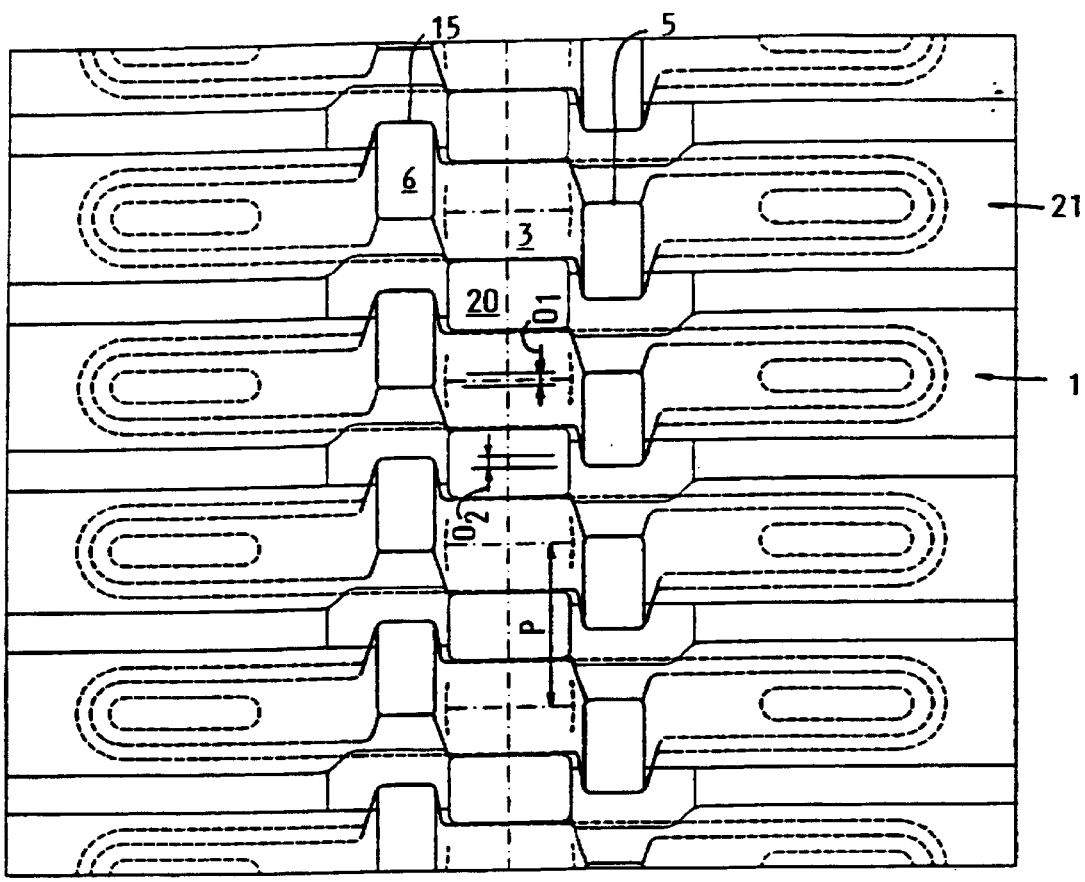
FIG. 4 shows a view of the bottom side of a rubber crawler of this invention.
Figure 6:
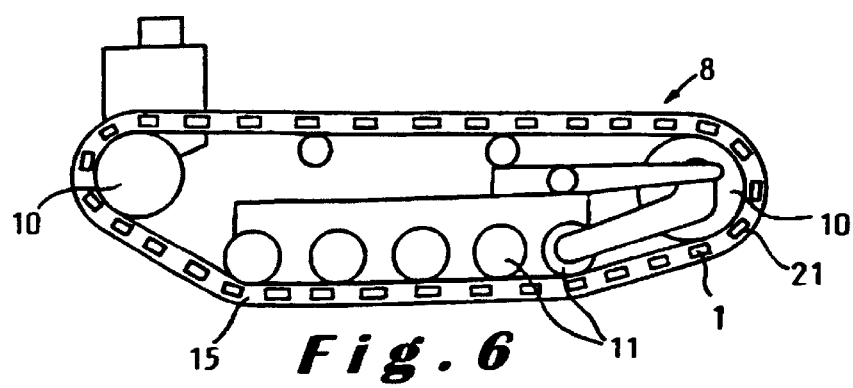
FIG. 6 shows a view of a crawler mounted on a machine.

The rubber crawler 8 shown in FIG. 6 comprises an endless rubber belt 9 which is driven around toothed driving wheels 10. Along the interior of the rubber belt 18, between the driving wheels 10, supporting rolls 11 are located for the supporting of the rubber belt 9. In circumferential direction of the belt 9 a plurality of substantially parallel metal links 1, 21 are embedded on substantially regular distances from each other. Holes 20 are located in between successive metal links 1, 21 in the center of the rubber belt, in which holes the driving wheels engage upon driving the rubber belt 9, as shown in FIG. 4. The metal links 1 are mostly subjected to a chemical pre-treatment in order to bring about a chemical bonding of the metal to the rubber of the belt 9.

As shown in FIGS. 1 and 2 each metal link 1 comprises a first and a second protrusion 5, 15 which form the running surface for the supporting rolls. Between each protrusion 5, 15 and the end 19 of the metal link 1 a side guiding 23 may be provided (see FIG. 7).

The metal link 1 shown in FIGS. 1 and 2 comprises a basis 2 which has a width $W_b$ at the bottom. In the center the basis 2 comprises a sprocket 3 which has a width $W_s$ taken in longitudinal direction of the belt 9 or in transverse direction of the metal link 1. On both sides of the sprocket 3 a wing 4 is located which extends in transverse direction of the rubber belt 9.

The wing 4 can have various shapes. In longitudinal direction of the link 1 the wing 4 can have a constant or variable height over its entire length, but preferably has an almost constant height. Over its entire height the wing 4 can have a constant width $W_W$ or a varying width $W_W$. Preferably the width of the wing at the basis $W_{W2}$ is larger than the width of the top surface $W_{W1}$ of the wing 4 to permit that the wing can tilt in the rubber belt 9 and the flexibility and bendability of the rubber crawler 8 can be improved. Preferably in the wing 4 on both ends 19 of the metal link 1, a hole 13 is provided which extends through the entire height of the basis in order to provide an improved anchoring of the metal link 1 in the rubber belt 9.

The metal link 1 comprises a first protrusion 5 and a second protrusion 15. The first and second protrusions 5, 15 are, taken in transverse direction of the rubber crawler 8, provided on opposite sides of the sprocket 3. The first protrusion 5 has a first top surface 6 with a length $W_t$, taken in transverse direction of the metal link 1 or in longitudinal direction of the rubber belt 9. The second protrusion 15 has a second top surface 16 with a length $W_t$, taken in transverse direction of the metal link 1 or in longitudinal direction of the rubber belt 9. The lengths $W_t$ of the first and second protrusions 6, 16 are preferably equal. The length $W_t$ of the top surface 6, 16 is preferably smaller than or equal to the width $W_b$ of the basis 2, which brings along that the protrusions 5, 15 do not extend with respect to the basis 2 of the metal link 1, taken in longitudinal direction of the rubber crawler.

Because the protrusions 5, 15 do not extend with respect to the basis 2 of the metal link 1 it is possible to obtain a reinforced connection between the running surfaces 6, 16 for the supporting rolls 11 and the basis 2 of the link 1, and an improved transfer of forces exerted on the running surface to the basis 2. Because of the smaller running surface the use of material and correspondingly the weight of the metal links 1, 21 can be minimized, which has a positive influence on the cost of the metal links. On the other hand it is possible to still ensure a maximal overlap of the running surfaces 6, 16 at a minimal contact length and to minimize the noise which is created by the movement of the supporting rolls 11.

The first protrusion 5 has, taken in transverse direction of the rubber crawler, a first front surface 7 which preferably is substantially flat and slants with an angle $\alpha<90°$ with respect to the basis of the metal link 1. The first protrusion 5 preferably also comprises a first back surface 27 which over almost its entire height runs parallel to the front surface 7.

Figure 5A:
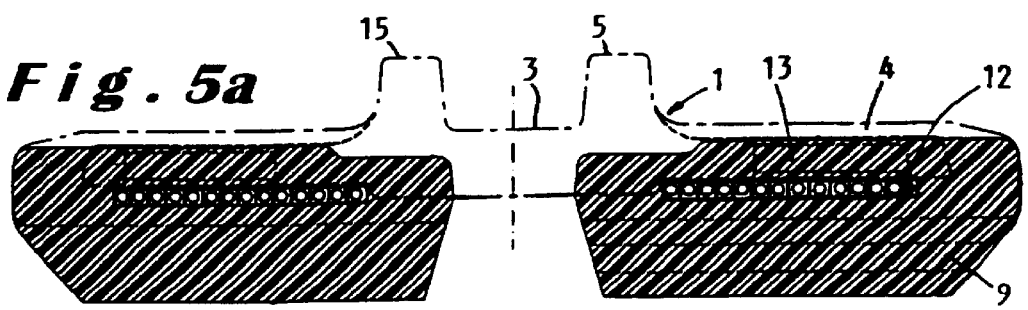
FIG. 5a shows a cross-section of a rubber crawler of this invention.
Figure 5B:
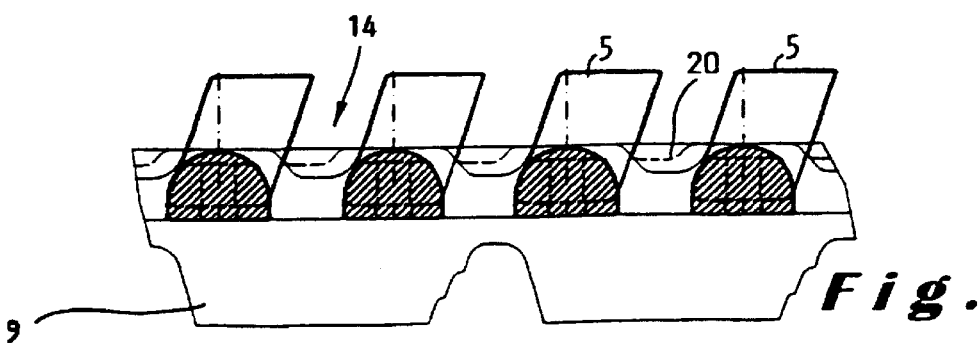
FIG. 5b shows a in longitudinal direction.

The second protrusion 15 has, taken in transverse direction of the rubber crawler, a second front surface 17 which preferably is substantially flat and slants with an angle $\beta<90°$ with respect to the basis of the metal link 1. $\alpha$ is preferably substantially equal to $\beta$. The second protrusion 16 preferably also comprises a second back surface 28 parallel to the second front surface 17. Because the first and second front surface 7, 17 are made as flat as possible, it can be achieved that the metal links are embedded in the rubber belt 9 in such a way that the protrusions 5 and 15 are substantially free of rubber and that between the first and second front surface 7, 17 there is a space which is substantially free of rubber (FIGS. 4 and 5).

The first and second protrusions 5, 15 slant with respect to the basis in opposite direction with respect to each other, so that the first and second top surfaces 6, 16 are shifted with respect to each other in longitudinal direction of the rubber crawler 8, to further improve the continuity of the running surface for the supporting rolls 11. This means that, taken in longitudinal direction of the rubber belt 9, the top surface 6 of the first protrusion 5 is for example shifted towards the front with respect to the top surface 16 of the second protrusion 15 (FIG. 2a, 2b, 4 and 5). The width of the protrusions 5, 15 on the position where they pass into the wing 4 is preferably equal to the width $W_{W2}$ of the wing 4, taken in longitudinal direction of the rubber crawler 8.

The top surfaces 6, 16 of the first protrusion 5 and the second protrusion 15 of a same metal link 1 are preferably shifted in such a way with respect to each other that their running surfaces partly overlap with an overlap $O_1$ which is larger than or equal to zero. This staggered positioning of the protrusions makes it possible to ensure that a supporting roll 11, during its movement over a metal link 1, first ends up on the first top surface 6, and already comes into contact with the second top surface 16 before it has fully left the first top surface 6.

Successive metal links 1 are preferably mounted in such a way with respect to each other that the running surfaces formed by the top surface of the first protrusion 5 of a first metal link and the top surface of the second protrusion 15 of a subsequent metal link 21 show an overlap $O_2$ which is also larger than or equal to zero. In this way it can be achieved that a supporting roll 11, in the course of its displacement over a first metal link 1, already comes into contact with the top surface 16 of the subsequent metal link 21 before it has fully left the top surface 6 of the first metal link 1. Because both $O_1$ and $O_2>0$ also wear of the metal link 1, 21 along the edges of the top surface of the protrusions 5, 15 can be reduced, as well as the stresses thereby created in the rubber.

In the rubber crawler 8 of this invention the length of the top surfaces 6, 16 of the first and second protrusions $W_t$ is preferably larger than or equal to the width of the sprocket 3 $W_s$, measured in longitudinal direction of the rubber belt 9, in order to ensure a sufficient overlap between the top surfaces 6, 16 of successive metal links 1, 21. This is particularly important if $W_s$ is very small.

The first and second protrusions 5, 15 can have various shapes, but preferably have substantially constant dimensions in upward direction of the protrusion and in transverse direction and longitudinal direction of the rubber crawler 8, as is shown in FIGS. 3a and 3b. The top surfaces 6, 16 of the first and second protrusions 5, 15 can have various shapes, depending on the field of application of the rubber belt and can for example be substantially flat, rounded or stepped.

In the rubber belt 9 preferably one or more steel cords 9 are embedded in order to improve the tensile strength of the rubber belt 9 in longitudinal direction.

Figure 7A:
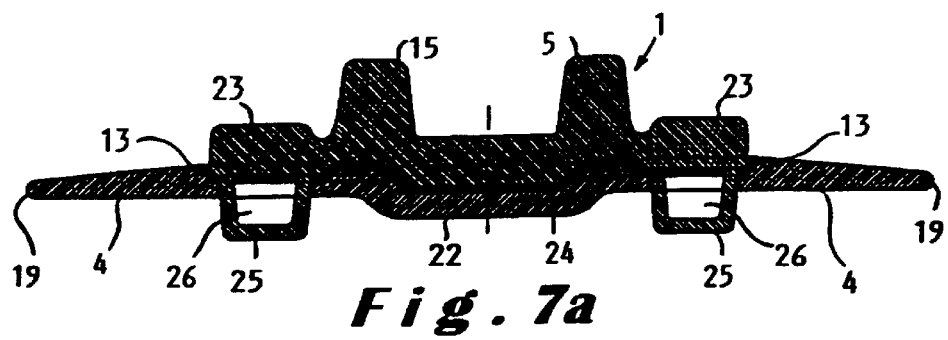
FIGS. 7a and 7b show a section of an alternative embodiment of the metal link of this invention, respectively not embedded and embedded in the rubber belt.

The metal link 1 of this invention can be constructed in one piece or in two or more separate pieces. In the latter case the metal link 1 comprises, as is shown in FIGS. 7a and b, a carrier 22 and a guiding 23 for guiding the supporting rolls 11.

The carrier 22 and guiding 23 are constructed as separate pieces and are preferably connected to each other with damping layer 24, for absorbing the vibrations caused by the movement of the supporting rolls 11 over the rubber belt 9. Because of the presence of the damping layer 24 it is also possible to prevent that vibrations are transferred through the exterior of the rubber crawler 8 right to the interior. The material from which the damping layer 24 is constructed is preferably chosen such that it not only functions as a means to absorb vibrations, but also as a bonding means for bonding the carrier 22 and the guiding 23. The damping layer 4 can be made from a wide range of materials known to the man skilled in the art, for example an elastic synthetic, for example a flexible rubber. The damping layer 24 can for example be constructed in a rubber which is the same as the rubber in which the rubber belt 15 is constructed, or in a different material.

The guiding 23 can be constructed in one or more pieces. In the embodiment shown in FIGS. 7a–b the guiding 23 is constructed in one piece. In the carrier 22 a first and a second hole 13 are provided which extend through the entire thickness of the carrier 22 for receiving a guiding 23. Since the guiding 23 is liable to wear because of the frequent contact with the supporting rolls 11, it is preferably constructed in a wear-resistant material, preferably a metal with a high resistance to wear.

The guiding 23 is preferably provided with a third and a fourth protrusion 25, which preferably extend through the entire thickness of the carrier 22 and comprise a hole 26 to permit an improved anchoring of the guiding 23 in the rubber belt 9. In circumferential direction of the rubber belt 9 mostly steel cords 12 are provided for giving tensile strength to the rubber crawler 8. The steel cords 12 are led in circumferential direction of the crawler through the holes 26 of successive metal links 1, 21. Because of this mechanical anchoring it is possible to prevent that, upon breaking the chemical bonding of the metal to the rubber, the metal links 1, 21 can come loose from the rubber crawler 8.

The guiding 23 in a same metal link and of successive metal links are preferably mounted crossways, in order to improve the continuity of the running surface of the supporting rolls 11. In function of the appliance can be chosen for a guiding 23 which lies on the carrier 22 or which is flush-mounted into it. The guiding 23 is preferably tiltably mounted in the carrier 22 in order to facilitate the overcoming of transverse obstructions and reduce the vibrations which occur in the overcoming of transverse obstructions.

Figure 7B:
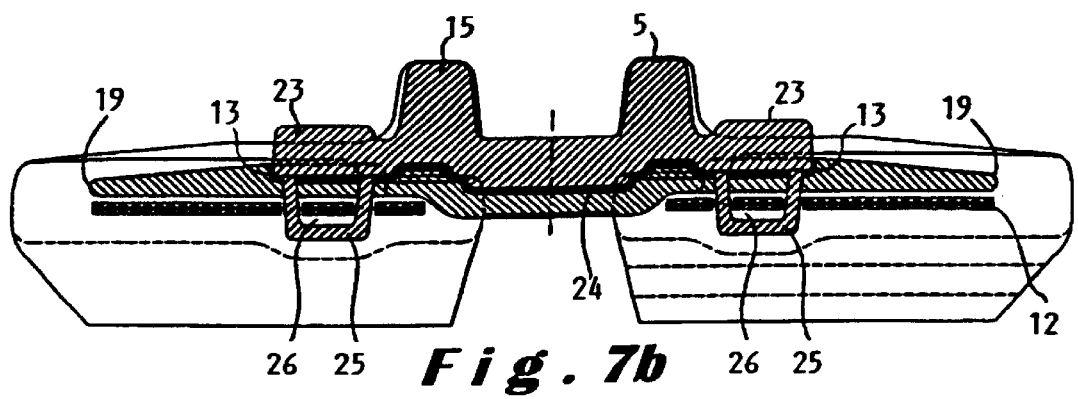

The carrier 22 and guiding 23 can be constructed from the same or from different materials, but preferably from different materials. As is shown in FIGS. 7a and 7b the carrier 22 and the guiding 23 can be provided with complementary, co-operating profiled surfaces to permit an improved positioning of carrier 22 and sprocket 3 with respect to each other.

Figure 8:
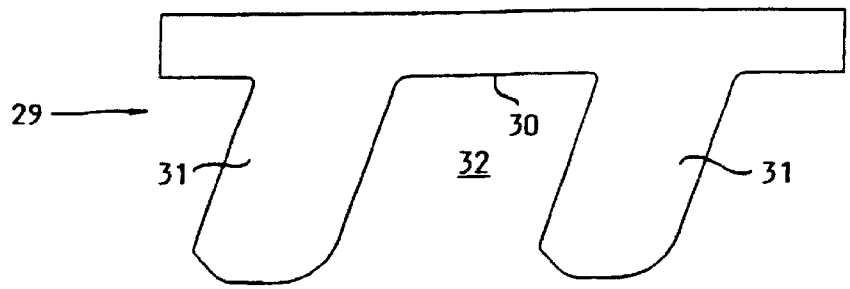
FIG. 8 shows a side-view of the holder for use in the process of this invention.

The holder 29 shown in FIG. 8 for use in the process of this invention is oblong and contains a bottom 30, in which a plurality of parallel partitions 31 are provided, on a predetermined distance from each other. Between the partitions 31 holes 32 are provided for receiving protrusions 5 or 15 of successive metal links 1, 21. The metal links 1 are mounted in such a way with respect to the holder 29 that the top surface 6, 16 of the protrusion rests on the bottom 30 in the hole 32 between the partitions 31 of the holder 29. The partitions 31 are mounted in such a way with respect to each other that a minimal play exists between respectively the front surface 7, 17 and the partition on the one hand and the back surface 27, 28 of the protrusion 5, 15 and the partition on the other hand, in order to prevent that rubber is deposed onto the protrusions 5, 15.

What is claimed is:

1. A rubber crawler comprising: an endless rubber belt driven around two toothed wheels, a plurality of metal links being embedded in circumferential direction of the rubber belt on regular distances from and substantially parallel to each other, the metal links extending in transversal direction of the rubber belt for guiding supporting rolls provided between the wheels, each metal link comprising:
   a basis with a center, in which center a sprocket is provided;
   a first and second wing extending in transverse direction of the rubber belt, the first wing being situated on a first side of the sprocket, the second wing being provided on a second side of the sprocket opposite the first side; and
   a first protrusion on the first side of the sprocket, between the sprocket and the first wing, and a second protrusion on the second side of the sprocket, between the sprocket and the second wing, the first and second protrusion extending in upward direction of the metal link with respect to the basis and in height direction of the rubber belt, the first and second protrusion respectively comprising a first and second top surface, wherein,
   the basis taken in longitudinal direction of the rubber belt has a width $W_b$,
   the first and second top surfaces taken in longitudinal direction of the rubber belt have a length $W_t$, with $W_t \leq W_b$,
   the first and second protrusions respectively show in transverse direction of the metal link a first and second front surface, the first and second front surface being located on opposite sides of the metal link,
   the first and second front surfaces are substantially flat, extend from the basis in upward direction of the metal link, slant in opposite direction with respect to the basis and respectively form an angle $\alpha$ and $\beta < 90°$ with respect to the basis,
   $\alpha$ and $\beta$ and $W_t$ are chosen such that the first and second top surfaces in transverse direction of a metal link show an overlap $O_1 \geq 0$ and that the first and second top surfaces of successive metal links in transverse direction of the rubber belt show an overlap $O_2 > 0$, with $O_1 + O_2 = 2W_t - P$, in which P is the distance between the centers of two successive metal links, and
   between the first and second front surface of respectively the first and second protrusion and the rubber belt a space is present which is substantially free of rubber.

2. A rubber crawler as claimed in claim 1, wherein $O_1$ is substantially equal to $O_2$.

3. A rubber crawler as claimed in claim 1 or 2, wherein $W_t$ of the first and second protrusions is larger than or equal to $W_s$, in which $W_s$ is the width of the sprocket.

4. A rubber crawler as claimed in claim 1 or 2, wherein the first and second wing over substantially their entire length have a substantially constant width $W_W$, measured in longitudinal direction of the rubber crawler.

5. A rubber crawler as claimed in claim 1 or 2, wherein $\alpha$ is substantially equal to $\beta$, and that $W_t$ of the first protrusion is substantially equal to $W_t$ of the second protrusion.

6. A rubber crawler as claimed in claim 1 or 2, wherein the first and second protrusions on a position where they pass into the basis, taken in longitudinal direction of the crawler, have a width which is substantially equal to $W_{W2}$.

7. A rubber crawler as claimed in claim 1 or 2, wherein the basis of each metal link has a width $W_b$ taken in longitudinal direction of the crawler, and in that the length $W_t$ of the top surfaces of the first and second protrusions is smaller than or equal to $W_b$.

8. A rubber crawler as claimed in claim 1 or 2, wherein the metal link has a first and a second end on respectively a first and second side of the sprocket, and in that on the first and second end of the metal link a hole is provided the holes extending in transverse direction of the crawler through the entire thickness of the metal link.

9. A rubber crawler as claimed in claim 1 or 2, wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

10. A metal link as part of a rubber crawler as claimed in claim 1.

11. A rubber crawler as claimed in claim 3 wherein the first and second wing over substantially their entire length have a substantially constant width $W_w$, measured in longitudinal direction of the rubber crawler.

12. A rubber crawler as claimed in claim 3 wherein $\alpha$ is substantially equal to $\beta$, and that $W_t$ of the first protrusion is substantially equal to $W_t$ of the second protrusion.

13. A rubber crawler as claimed in claim 4 wherein $\alpha$ is substantially equal to $\beta$, and that $W_t$ of the first protrusion is substantially equal to $W_t$ of the second protrusion.

14. A rubber crawler as claimed in claim 3 wherein the first and second protrusions on a position where they pass into the basis, taken in longitudinal direction of the crawler, have a width which is substantially equal to $W_{w2}$.

15. A rubber crawler as claimed in claim 4 wherein the first and second protrusions on a position where they pass into the basis, taken in longitudinal direction of the crawler, have a width which is substantially equal to $W_{w2}$.

16. A rubber crawler as claimed in claim 5 wherein the first and second protrusions on a position where they pass into the basis, taken in longitudinal direction of the crawler, have a width which is substantially equal to $W_{w2}$.

17. A rubber crawler as claimed in claim 3 wherein the basis of each metal link has a width $W_b$ taken in longitudinal direction of the crawler, and in that the length $W_t$ of the top surfaces of the first and second protrusions is smaller than or equal to $W_b$.

18. A rubber crawler as claimed in claim 4 wherein the basis of each metal link has a width $W_b$ taken in longitudinal direction of the crawler, and in that the length $W_t$ of the top surfaces of the first and second protrusions is smaller than or equal to $W_b$.

19. A rubber crawler as claimed in claim 5 wherein the basis of each metal link has a width $W_b$ taken in longitudinal direction of the crawler, and in that the length $W_t$ of the top surfaces of the first and second protrusions is smaller than or equal to $W_b$.

20. A rubber crawler as claimed in claim 6 wherein the basis of each metal link has a width $W_b$ taken in longitudinal direction of the crawler, and in that the length $W_t$ of the top surfaces of the first and second protrusions is smaller than or equal to $W_b$.

21. A rubber crawler as claimed in claim 3 wherein the metal link has a first and a second end on respectively a first and second side of the sprocket, and in that on the first and second end of the metal link a hole is provided the holes extending in transverse direction of the crawler through the entire thickness of the metal link.

22. A rubber crawler as claimed in claim 4 wherein the metal link has a first and a second end on respectively a first and second side of the sprocket, and in that on the first and second end of the metal link a hole is provided the holes extending in transverse direction of the crawler through the entire thickness of the metal link.

23. A rubber crawler as claimed in claim 5 wherein the metal link has a first and a second end on respectively a first and second side of the sprocket, and in that on the first and second end of the metal link a hole is provided the holes extending in transverse direction of the crawler through the entire thickness of the metal link.

24. A rubber crawler as claimed in claim 6 wherein the metal link has a first and a second end on respectively a first and second side of the sprocket, and in that on the first and second end of the metal link a hole is provided the holes extending in transverse direction of the crawler through the entire thickness of the metal link.

25. A rubber crawler as claimed in claim 7 wherein the metal link has a first and a second end on respectively a first and second side of the sprocket, and in that on the first and second end of the metal link a hole is provided the holes extending in transverse direction of the crawler through the entire thickness of the metal link.

26. A rubber crawler as claimed in claim 3 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

27. A rubber crawler as claimed in claim 4 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

28. A rubber crawler as claimed in claim 5 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

29. A rubber crawler as claimed in claim 6 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

30. A rubber crawler as claimed in claim 7 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

31. A rubber crawler as claimed in claim 8 wherein the metal link is built up of at least two parts that are connected to each other, a first part comprising a guiding for guiding and supporting rolls provided between the wheels, a second part comprising a carrier for receiving the guiding, the carrier and the guiding being constructed as separate pieces and being connected to each other.

* * * * *